(12) United States Patent
Mishalov et al.

(10) Patent No.: US 10,318,022 B2
(45) Date of Patent: Jun. 11, 2019

(54) PRESSURE SENSITIVE STYLUS

(71) Applicant: Microsoft Technology Licensing, LLC, Redmond, WA (US)

(72) Inventors: Vadim Mishalov, Tel-Aviv (IL); Ahia Peretz, Ramat-Gan (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/418,823

(22) Filed: Jan. 30, 2017

(65) Prior Publication Data

US 2018/0217684 A1 Aug. 2, 2018

(51) Int. Cl.
*G06F 3/0354* (2013.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/041* (2013.01); *G06F 2203/04101* (2013.01); *G06F 2203/04105* (2013.01); *G06F 2203/04108* (2013.01)

(58) Field of Classification Search
CPC .... G06F 3/03545; G06F 3/0383; G06F 3/041; G06F 2203/04101; G06F 2203/04105; G06F 2203/04108
See application file for complete search history.

(56) References Cited

U.S. PATENT DOCUMENTS

| 4,111,052 A | 9/1978 | Sniderman |
| 4,451,698 A | 5/1984 | Whetstone et al. |
| 4,672,154 A | 6/1987 | Rodgers et al. |
| 5,004,872 A | 4/1991 | Lasley |
| 5,138,118 A | 8/1992 | Russell |
| 5,206,785 A * | 4/1993 | Hukashima ......... G06F 3/03545 361/283.2 |
| 5,225,637 A | 7/1993 | Rodgers et al. |

(Continued)

FOREIGN PATENT DOCUMENTS

| EP | 0209467 A2 | 1/1987 |
| EP | 1349056 A2 | 10/2003 |

(Continued)

OTHER PUBLICATIONS

Flaherty "Pressure-Sensitive Stylus Gives Starving IPad Artists Incredible Control", Wired.com, 4 P., Oct. 1, 2013.

(Continued)

*Primary Examiner* — Sardis F Azongha

(57) ABSTRACT

An apparatus includes a housing, a tip that moves with respect to the housing based on applied contact force and a pressure sensor that detects the force applied on the tip. The pressure sensor includes a first element integrated or fixed to the tip and a second element that is stationary with respect to the housing and positioned to face the first element. The first element is formed from a rigid material that is conductive. The second element is conductive and has elastic properties. In addition, one of the first element or the second element is coated with a non-conductive layer. The first element moves toward the second element based on force applied on the tip and deforms the second element based on the force. The sensor additionally includes a circuit to detect capacitance between the first element and the second element.

20 Claims, 6 Drawing Sheets

(56) References Cited

U.S. PATENT DOCUMENTS

| | | |
|---|---|---|
| 5,414,227 A | 5/1995 | Schubert et al. |
| 5,528,002 A | 6/1996 | Katabami |
| 5,565,632 A | 10/1996 | Ogawa |
| 5,571,997 A | 11/1996 | Gray et al. |
| 5,576,502 A | 11/1996 | Fukushima et al. |
| 5,581,052 A | 12/1996 | Padula et al. |
| 5,793,360 A | 8/1998 | Fleck et al. |
| 5,914,708 A | 6/1999 | LaGrange et al. |
| 6,104,388 A | 8/2000 | Nagai et al. |
| 6,175,773 B1 | 1/2001 | Reiffel et al. |
| 6,211,863 B1 | 4/2001 | Chery et al. |
| 6,232,962 B1 | 5/2001 | Davis et al. |
| 6,249,234 B1 | 6/2001 | Ely et al. |
| 6,344,656 B1 | 2/2002 | Hopkins et al. |
| 6,474,888 B1 | 11/2002 | Lapstun et al. |
| 6,624,832 B1 | 9/2003 | Thomas |
| 6,690,156 B1 | 2/2004 | Weiner et al. |
| 6,707,451 B1 | 3/2004 | Nagaoka |
| 6,727,439 B2 | 4/2004 | Chao et al. |
| 6,853,369 B2 | 2/2005 | Fukushima et al. |
| 6,972,754 B2 | 12/2005 | Zank |
| 7,145,555 B2 | 12/2006 | Taylor et al. |
| 7,202,862 B1 | 4/2007 | Palay et al. |
| 7,210,046 B2 | 4/2007 | Truong |
| 7,279,646 B2 | 10/2007 | Xu |
| 7,292,229 B2 | 11/2007 | Morag et al. |
| 7,367,242 B2 | 5/2008 | Xi et al. |
| 7,372,455 B2 | 5/2008 | Perski et al. |
| 7,436,397 B2 | 10/2008 | Zank |
| 7,778,795 B2 | 8/2010 | Fukushima et al. |
| 7,843,439 B2 | 11/2010 | Perski et al. |
| 7,955,017 B2 | 6/2011 | Lapstun et al. |
| 8,199,132 B1 | 6/2012 | Oda et al. |
| 8,212,795 B2 | 7/2012 | Henry |
| 8,228,299 B1 | 7/2012 | Maloney et al. |
| 8,481,872 B2 | 7/2013 | Zachut |
| 8,536,471 B2 | 9/2013 | Stern et al. |
| 8,629,358 B2 | 1/2014 | Rimon et al. |
| 8,686,964 B2 | 4/2014 | Rimon |
| 8,780,089 B2 | 7/2014 | Yuan et al. |
| 8,878,823 B1 | 11/2014 | Kremin et al. |
| 9,063,591 B2 | 6/2015 | Alameh et al. |
| 9,116,558 B2 | 8/2015 | Yilmaz et al. |
| 9,122,322 B2 | 9/2015 | Stern et al. |
| 9,158,393 B2 | 10/2015 | Vlasov |
| 9,195,351 B1 * | 11/2015 | Rosenberg ............ G06F 1/1626 |
| 9,218,073 B1 | 12/2015 | Kremin et al. |
| 9,851,816 B2 * | 12/2017 | Chang ................ G06F 3/03545 |
| 9,874,951 B2 | 1/2018 | Stern |
| 2002/0040817 A1 | 4/2002 | Lekuch et al. |
| 2004/0001052 A1 | 1/2004 | Zank |
| 2005/0110777 A1 | 5/2005 | Geaghan et al. |
| 2005/0166076 A1 | 7/2005 | Truong |
| 2005/0195387 A1 | 9/2005 | Zhang et al. |
| 2006/0068851 A1 | 3/2006 | Ashman, Jr. |
| 2006/0109252 A1 | 5/2006 | Kolmykov-zotov et al. |
| 2006/0267966 A1 | 11/2006 | Grossman et al. |
| 2007/0014490 A1 | 1/2007 | Silverbrook et al. |
| 2007/0085836 A1 | 4/2007 | Ely |
| 2007/0146351 A1 | 6/2007 | Katsurahira et al. |
| 2007/0176909 A1 | 8/2007 | Pavlowski |
| 2008/0128180 A1 | 6/2008 | Perski et al. |
| 2009/0078476 A1 | 3/2009 | Rimon et al. |
| 2009/0114459 A1 | 5/2009 | Fukushima et al. |
| 2009/0122029 A1 | 5/2009 | Sin |
| 2009/0262637 A1 | 10/2009 | Badaye et al. |
| 2009/0289922 A1 | 11/2009 | Henry |
| 2010/0006350 A1 | 1/2010 | Elias |
| 2010/0051356 A1 | 3/2010 | Stern et al. |
| 2010/0084203 A1 | 4/2010 | Peng |
| 2010/0107770 A1 | 5/2010 | Serban et al. |
| 2010/0155153 A1 | 6/2010 | Zachut |
| 2010/0214252 A1 | 8/2010 | Wu |
| 2011/0090146 A1 | 4/2011 | Katsurahira |
| 2011/0241703 A1 | 10/2011 | Fukushima et al. |
| 2011/0304544 A1 | 12/2011 | Chuang et al. |
| 2012/0050231 A1 | 3/2012 | Westhues et al. |
| 2012/0228039 A1 | 9/2012 | Hinson et al. |
| 2012/0253699 A1 | 10/2012 | Kuno |
| 2012/0280947 A1 | 11/2012 | Weaver et al. |
| 2012/0327040 A1 | 12/2012 | Simon et al. |
| 2013/0141398 A1 | 6/2013 | Cho et al. |
| 2013/0321355 A1 | 12/2013 | Teiblum |
| 2014/0002422 A1 | 1/2014 | Stern et al. |
| 2014/0009863 A1 * | 1/2014 | Obata ................ G06F 3/03545 361/294 |
| 2014/0019070 A1 | 1/2014 | Dietz et al. |
| 2014/0132529 A1 | 5/2014 | Jeong |
| 2014/0210781 A1 | 7/2014 | Stern |
| 2014/0218343 A1 | 8/2014 | Hicks et al. |
| 2014/0306940 A1 | 10/2014 | Fukushima et al. |
| 2015/0054757 A1 | 2/2015 | Kuroda |
| 2015/0070316 A1 | 3/2015 | Oda et al. |
| 2015/0070330 A1 * | 3/2015 | Stern ................ G06F 3/03545 345/179 |
| 2015/0116289 A1 | 4/2015 | Stern et al. |
| 2015/0317001 A1 * | 11/2015 | Ben-Bassat ........ G06F 3/03545 345/179 |
| 2015/0324018 A1 | 11/2015 | Hinson |
| 2015/0370354 A1 | 12/2015 | Stern et al. |
| 2016/0085356 A1 | 3/2016 | Stern |
| 2016/0109965 A1 | 4/2016 | Chan et al. |
| 2016/0124530 A1 | 5/2016 | Stern |
| 2016/0162045 A1 | 6/2016 | Vincent |
| 2016/0231833 A1 | 8/2016 | Gu et al. |
| 2016/0274684 A1 | 9/2016 | Li |
| 2017/0045961 A1 | 2/2017 | Stern |
| 2017/0045962 A1 | 2/2017 | Stern et al. |
| 2017/0068345 A1 | 3/2017 | Barel |

FOREIGN PATENT DOCUMENTS

| | | |
|---|---|---|
| EP | 2187288 A2 | 5/2010 |
| EP | 2204724 A1 | 7/2010 |
| EP | 2339432 A2 | 6/2011 |
| EP | 2650758 A1 | 10/2013 |
| EP | 2818981 A1 | 12/2014 |
| JP | 06119101 A | 4/1994 |
| JP | 3327056 B2 | 9/2002 |
| WO | 0124157 A1 | 4/2001 |
| WO | 2002041129 A2 | 5/2002 |
| WO | 2009143046 A3 | 11/2009 |
| WO | 2010086035 A1 | 8/2010 |
| WO | 2012123951 A2 | 9/2012 |
| WO | 2013160887 A1 | 10/2013 |
| WO | 2014043239 A2 | 3/2014 |
| WO | 2015027017 A1 | 2/2015 |
| WO | 2016020818 A2 | 2/2016 |

OTHER PUBLICATIONS

Perez "Preliminary Search Received—Capacity Pressure Sensor Using Metallic Dome and Elastomer for Stylus", Microsoft Invention Disclosure Details, 8 P., Sep. 18, 2016.

Perez "Stylus Capacitive Pressure Sensor Using Metallic Dome and Elastomer", Microsoft Surface, Slide Show, 9 P., 2015.

"Automatic Switching Stylus for Pen-Based Computer Systems", In Proceedings of the IBM Technical Disclosure Bulletin, vol. 36, Issue 12, Dec. 1, 1993, pp. 583-584.

"Communication Relating to the Results of the Partial International Search Issued in PCT Application No. PCT/IL2012/050095", dated Jul. 25, 2012, 8 Pages.

"Communication Relating to the Results of the Partial International Search Issued in PCT Application No. PCT/IB2015/055863", dated Oct. 13, 2015, 6 Pages "Final Office Action Issued in U.S. Appl. No. 14/451,448", dated May 6, 2016, 17 Pages.

"Final Office Action Issued in U.S. Appl. No. 12/546,753", dated Jul. 3, 2012, 12 Pages.

"Final Office Action Issued in U.S. Appl. No. 13/908,063", dated Jun. 3, 2014, 13 Pages.

(56) References Cited

OTHER PUBLICATIONS

"Final Office Action Issued in U.S. Appl. No. 14/395,837", dated May 5, 2016, 18 Pages.
"Final Office Action Issued in U.S. Appl. No. 14/930,815", dated Jul. 19, 2017, 15 Pages.
Song, et al., "Grips and Gestures on a Multi-Touch Pen", Retrieved from: <<https://www.microsoft.com/en-us/research/wp-content/uploads/2016/02/GripsandGestures20MTPen-CHI201.pdf>>, May 7, 2011, pp. 1323-1332.
"International Preliminary Reporton Patentability Issued in PCT Application No. PCT/IB2015/055863", dated Oct. 19, 2016, 10 Pages.
"International Preliminary Report on Patentability Issued in PCT Application No. PCT/IL2012/050143", dated Nov. 6, 2014, 20 Pages.
"International Preliminary Report on Patentability Issued in PCT Application No. PCT/IL2012/050095", dated Sep. 26, 2013, 18 Pages.
"International Search Report and Written Opinion Issued in PCT Application No. PCT/IL2012/050095", dated Sep. 7, 2012, 24 Pages.
"International Search Report and Written Opinion Issued in PCT Application No. PCT/IL2013/050836", dated Mar. 6, 2014, 10 Pages.
"International Search Report and Written Opinion Issued in PCT Application No. PCT/US2016/045661", dated Nov. 21, 2016, 13 Pages.
"International Search Report and Written Opinion Issued in PCT Application No. PCT/IB2015/055863", dated Jan. 26, 2016, 19 Pages.
"International Search Report and Written Opinion Issued in PCT Application No. PCT/US18/014754", dated Apr. 11, 2018, 10 Pages.
"International Search Report and Written Opinion Issued in PCT Application No. PCT/IL2012/050143", dated Jan. 16, 2013, 23 Pages.
"Invitation to Pay Additional Fees Issued in PCT Application No. PCT/IB2015/055863", dated May 31, 2016, 6 Pages.
"Non-Final Office Action Issued in U.S. Appl. No. 15/335,517", dated Jan. 20, 2017, 11 Pages.
"Non-Final Office Action Issued in U.S. Appl. No. 15/338,549", dated Apr. 12, 2017, 22 Pages.
"Non-Final Office Action Issued in U.S. Appl. No. 14/451,448", dated Oct. 21, 2015, 22 Pages.
"Non-Final Office Action Issued in U.S. Appl. No. 14/848,527", dated Dec. 19, 2016, 16 Pages.
"Non-Final Office Action Issued in U.S. Appl. No. 12/546,753", dated Oct. 19, 2012, 15 Pages.
"Non-Final Office Action Issued in U.S. Appl. No. 12/546,753", dated Jan. 31, 2012, 12 Pages.
"Non-Final Office Action Issued in U.S. Appl. No. 13/908,063", dated Dec. 19, 2013, 12 Pages.
"Non-Final Office Action Issued in U.S. Appl. No. 14/395,837", dated Oct. 8, 2015, 24 Pages.
"Non-Final Office Action Issued in U.S. Appl. No. 14/839,985", dated Feb. 22, 2016, 10 Pages.
"Non-Final Office Action Issued in U.S. Appl. No. 14/005,308", dated Nov. 25, 2014, 20 Pages.
"Non-Final Office Action Issued in U.S. Appl. No. 14/702,726", dated Mar. 24, 2017, 12 Pages.
"Non-Final Office Action Issued in U.S. Appl. No. 14/930,815", dated Apr. 14, 2017, 14 Pages.
Hoffman, Chris, "Not All Tablet Styluses Are Equal: Capacity, Wacom, and Bluetooth Explained", Retrieved from: <<http://www.howtogeek.com/177376/not-all-tablet-styluses-are-equal-capacitive-wacom-and-bluetooth-explained/>>, Dec. 9, 2013, 4 Pages.
"Second Written Opinion Issued in PCT Application No. PCT/IB2015/055863", dated Sep. 2, 2016, 11 Pages.
Jones, Dani, "Stylus Reviews: TruGlide Apex Review", Retrieved from: <<http://ipadforartists.com/category/reviews/stylus-reviews>>, Nov. 21, 2013, 4 Pages.
"Supplemental Notice of Allowance Issued in U.S. Appl. No. 12/546,753", dated May 8, 2013, 2 Pages.

* cited by examiner

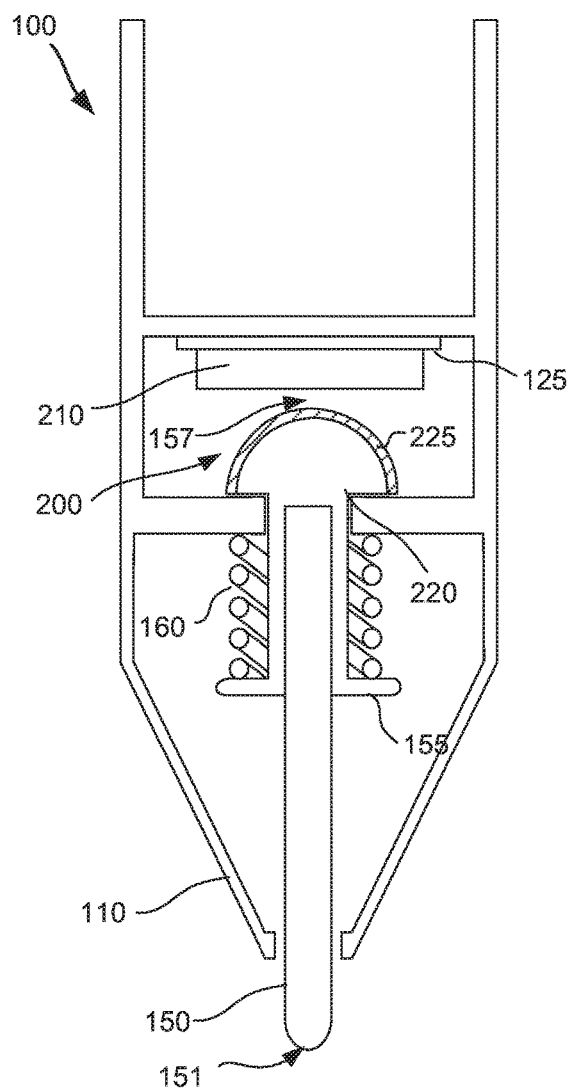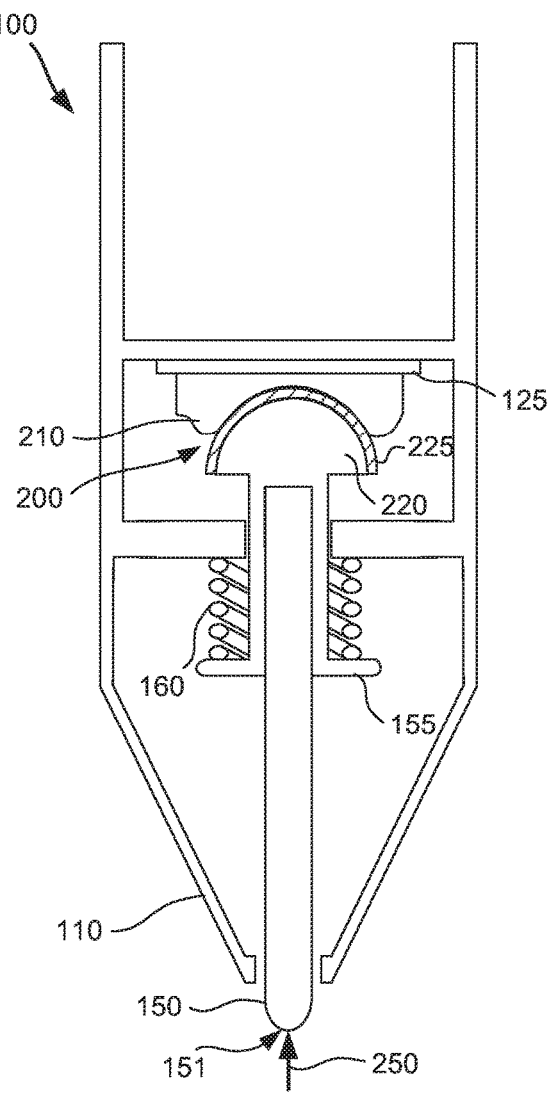

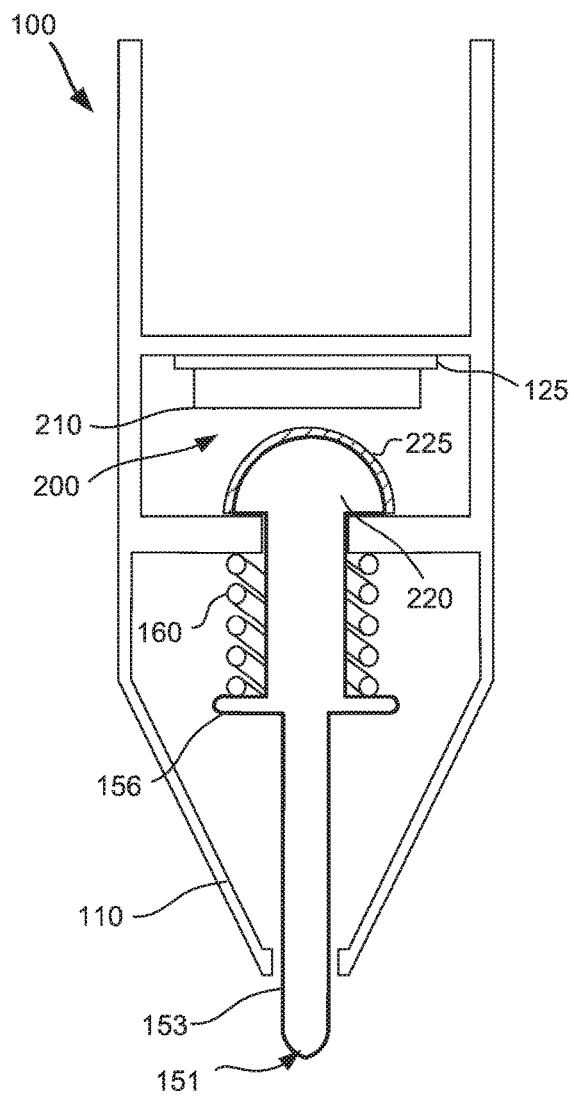
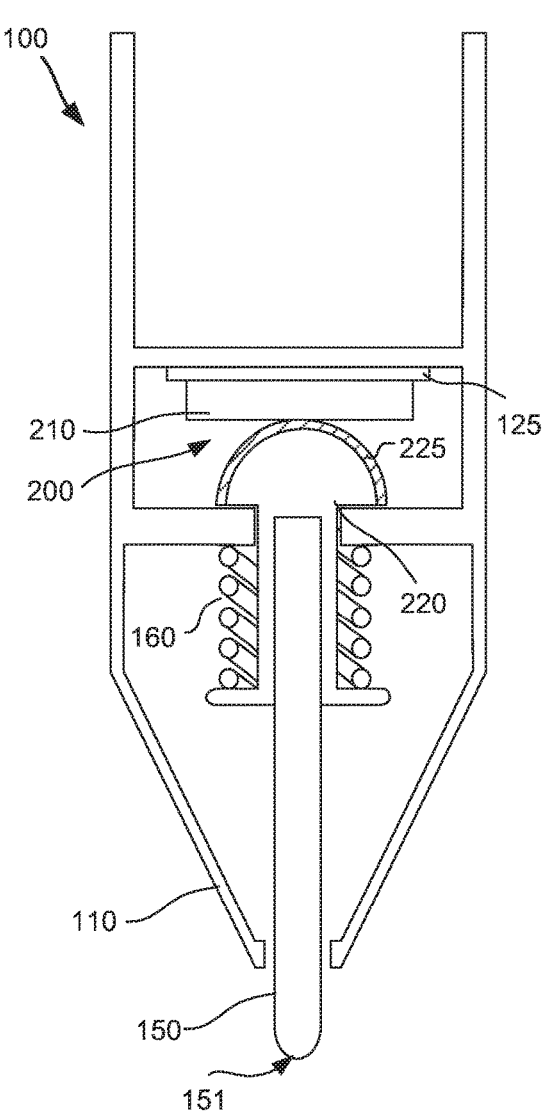
FIG. 4
FIG. 5

PRESSURE SENSITIVE STYLUS

FIELD AND BACKGROUND OF THE INVENTION

Styluses are known in the art for use with a computing device. Position detection of a stylus provides input to a digitizer sensor associated with the computing device and may be interpreted as user command. Position detection may be performed while a tip of the stylus is either touching and/or hovering over a detection surface of the digitizer sensor. The digitizer sensor is often integrated within an electronic display screen and the computing device correlates position of the stylus with information portrayed on the screen.

Some styluses are pressure sensitive in that they sense and optionally report a level of pressure applied on the stylus tip while a user is using the stylus. An application executed on the computing device may then use this information. For example, a graphic application may adjust line thickness or shade of a drawn line based on detected pressure levels.

SUMMARY OF THE INVENTION

The disclosure relates to a handheld device including a sensor for sensing pressure applied on an interacting tip of the device. The handheld device may be, for example, a stylus. According to embodiments of the disclosure, the sensor is an improved capacitive based pressure sensor that may be implemented at low cost, has a relatively simple construction and may provide improved sensitivity and accuracy.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, example methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some implementations of the disclosure are herein described, by way of example only, with reference to the accompanying drawings. With specific reference now to the drawings in detail, it is stressed that the particulars shown are by way of example and for purposes of illustrative discussion of implementations of the disclosure. In this regard, the description taken with the drawings makes apparent to those skilled in the art how implementations of the disclosure may be practiced.

In the drawings:

FIGS. 2A and 2B are simplified schematic drawings of elements of an example pressure sensor that may be integrated in the stylus, the sensor shown in a neutral and pressed state respectively;

FIG. 4 is a simplified schematic drawing showing an alternate configuration for an example pressure sensor integrated with a stylus;

FIG. 5 is a simplified schematic drawing showing yet another configuration for an example pressure sensor integrated with a stylus;

DESCRIPTION OF SPECIFIC EMBODIMENTS OF THE INVENTION

Figure 1:
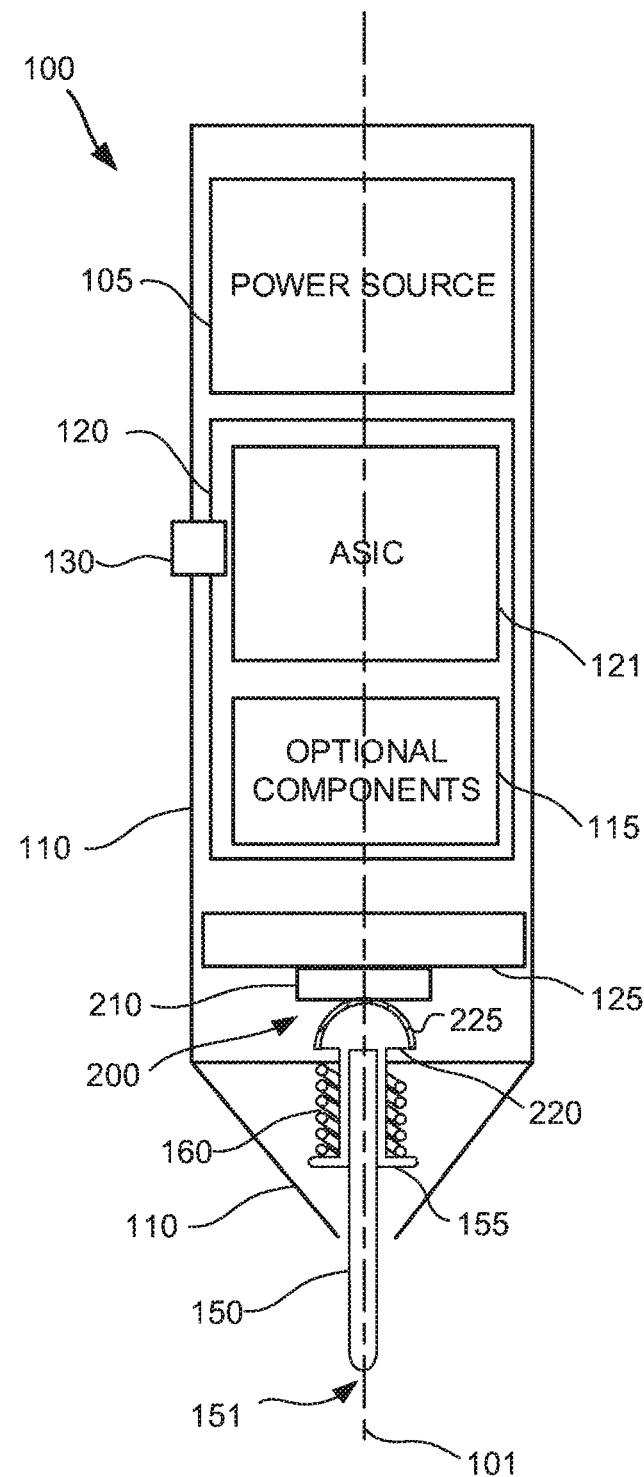
FIG. 1 is a simplified block diagram of an example pressure sensitive stylus.

A handheld device with an interacting tip that is movable with respect to a housing of the device includes a capacitive based pressure sensor for sensing pressure applied on the tip while a user is operating the device. According to some example implementations, the sensor includes a rigid element fixed to the interacting tip, an elastomer fixed to the housing and a circuit to detect capacitive coupling between them. The rigid element and the elastomer are positioned in the housing such that when pressure is applied on the interacting tip, the rigid element moves toward the elastomer and presses against it. Both the rigid element and the elastomer are electrically conductive. In some example implementations, the rigid element is coated with an electrically isolating material that provides a dielectric separation between the rigid element and the elastomer. Alternatively or additionally, the elastomer may be coated with an electrically isolating material that provides the dielectric separation. Pressure applied on the tip may be sensed based on a level of capacitive coupling detected.

Optionally, the rigid element is formed on one end of the tip or tip holder and is integral with the interaction tip or a tip holder that holds the tip, e.g., formed as a single part. By integrating the rigid element with an existing part in the device, the bill of materials may be reduced, tolerances related to connecting parts may be eliminated, and any malfunction due to disengagement between parts may be avoided. Another advantage in integrating the rigid element with an existing part may be reducing space required to incorporate the pressure sensor.

Typically, one of the rigid element and the elastomer is dome shaped, coned shaped or otherwise not flat so that an effective area of contact between the elements may change as a function of pressure. This may improve a resolution at which pressure may be detected since both proximity and contact area between the rigid element and elastomer may affect the capacitive coupling detected.

In some implementations, a shape of the rigid element provides a desired force curve, e.g. a desired relationship between capacitive coupling detected and pressure applied on the tip. An advantage of forming the desired shape with the rigid element and using a flat elastomer is that the material of the rigid element, e.g., metal or conductive plastic, may be shaped with lower tolerances than the elastomer. Due to the simplicity in the design and low tolerances of the parts, the desired force curve may be consistent over time and over a range of temperatures. In implementations in which the rigid element is integral to the tip or tip holder, shaping the rigid element to a defined shape would likely not increase cost and would likely eliminate a need to manufacture the elastomer in a required shape.

When the desired shape is provided by the rigid element, a flat elastomer may be selected from available off-the-shelf products.

In some implementations, sensitivity of the sensor is improved by operating the sensor with a thin non-conductive coating layer ranging between an order of magnitude of 10 nm and an order of magnitude of 10 µm, e.g. less than 20 µm on rigid element. The permittivity constant of the non-conductive coating may be selected to provide a dielectric or non-conductive layer with desired properties.

In implementations in which the dielectric layer is a coating applied on the rigid element, a thickness may be controllably limited to a desired thickness with low tolerances using standard manufacturing methods, e.g. using an anodizing manufacturing process. By controlling a thickness of the layer, accuracy of the sensor may be improved and manufacturability variation between sensor may be reduced.

This may eliminate the need to calibrate each sensor. This implementation is advantageous over known methods of using a layer of printed circuit board as the dielectric layer that is both thicker and associated with higher tolerances with regard to its thickness as well as higher costs. In some examples, defined texture is applied on the coating or part of the coating to reduce adhesion between the coating and the elastomer during contact. Texture may also be applied at relatively low cost during coating with standard manufacturing methods. Optional manufacturing methods for adding texture may include for example abrasive blasting or erosion.

Reference is now made to FIG. 1 showing a simplified block diagram of an example pressure sensitive stylus. In some implementations, a stylus 100 includes a housing 110 that houses a power source 105, one or more printed circuit board (PCB) assemblies 120 and 125, one or more user controlled buttons 130, a writing tip 150, a pressure sensor 200 associated with writing tip 150 and optional components 115, e.g. additional sensors. Power source 105 may include one or more rechargeable batteries and/or super capacitors. PCB assembly 120 may include an ASIC 121 that controls operation of stylus 100. During operation of stylus 100, ASIC 121 may generate a signal and the signal may be transmitted via writing tip 150 or via a tip holder 155 associated with writing tip 150.

Writing tip 150 is typically configured to slide in and out of housing 110 in response to contact pressure applied on an end 151. An elastic element 160 such as a coil spring may be coupled to housing 110 and writing tip 150 and may provide a resilient force against movement of writing tip 150. In some implementations, writing tip 150 is fixed, e.g. press fitted to tip holder 155 and tip holder 155 is mechanically coupled to elastic element 160. A range of motion of writing tip 150 may be in the order of magnitude of a 10 µm, e.g. 0-80 µm.

Pressure sensor 200 may be a capacitive-based sensor that includes a rigid element 220 as a first electrode of a capacitor and an elastomer 210 as a second electrode of the capacitor. Pressure detected by pressure sensor 200 is related to capacitive coupling between rigid element 220 and elastomer 210. Rigid element 220 may be fixed to writing tip 150 and may press against elastomer 210 when contact pressure is applied on end 151 of writing tip 150. Both rigid element 220 and elastomer 210 may be formed from conductive material. In some example implementations, rigid element 220 is coated with a layer of isolating material 225 that provides electrical isolation, e.g. a dielectric layer between rigid element 220 and elastomer 210 during physical contact.

In some example implementations, elastomer 210 is a flat element mounted on PCB 125. PCB 125 with elastomer 210 may be fixed to housing 110 so that elastomer 210 faces rigid element 220, e.g. at an angle that is generally perpendicular to a longitudinal axis 101 of stylus 100. In some implementations, rigid element 220 may be dome shaped, coned shaped or otherwise not flat so that surface contact between rigid element 220 and elastomer 210 may change as rigid element 220 engages elastomer 210 with increased pressure. Rigid element 220 may be an extension of tip holder 155 and formed from the same material, e.g. metal or conductive plastic.

Elastomer 210 is electrically connected to PCB 120 and power source 105. In some implementations, ASIC 121 controls charging at least one of rigid element 220 and elastomer 210 for operation of pressure sensor 200. Pressure sensor 200 additionally includes a capacitive measurement unit to detect capacitive coupling between rigid element 220 and elastomer 210. The capacitive measurement unit may also be embedded in ASIC 121. Optionally, the capacitive measurement unit is an off-the-shelf unit, e.g. charge amplifier.

Output from pressure sensor 200 may be digitally encoded, e.g. by ASIC 121 and used to modulate a signal to be transmitted by stylus 100. The signal may be modulated to include information obtained from pressure sensor 200, as well as state of button(s) 130, stylus ID, battery health status, information from other sensors embedded within or communicating with the stylus and/or other information. In some example implementations, the information transmitted is pressure level. Optionally, the information transmitted is one of a hover or touch state as detected by pressure sensor 200.

Reference is now made to FIGS. 2A and 2B showing simplified schematic drawings of elements of an example pressure sensor that may be integrated in the stylus, the sensor shown in a neutral and pressed state respectively. Pressure sensor 200 monitors a level of capacitive coupling between rigid element 220 and elastomer 210. In some implementations, during hover, e.g. while no contact force is applied on end 151 of writing tip 150, a defined air gap 157 separates rigid element 220 from elastomer 210 (FIG. 2A). The air gap 157 may be maintained with a preloading force applied by elastic element 160.

When a contact force 250 applied on end 151 overcomes the preload of elastic element 160, writing tip 150 together with tip holder 155 and rigid element 220 moves toward elastomer 210. As rigid element 220 approaches elastomer 210, air gap 157 decreases and capacitive coupling increases. The resilient force applied by elastic element 160 may restore air gap 157 once force 250 is removed.

As force 250 increases, rigid element 220 is pushed against and deforms elastomer 210 (FIG. 2B). Layer 225 maintains electrical isolation between rigid element 220 and elastomer 210 during contact. Due to the dome shape of rigid element 220, surface contact area between rigid element 220 and elastomer 210 increases as rigid element further presses into and deforms elastomer 210. The increase in contact area increases capacitive coupling. Elastomer 210 may typically regain its neutral shape as force 250 is released and rigid element 220 is displaced from elastomer 210.

In some example implementations, a dielectric layer between rigid element 220 and elastomer 210 is layer 225. In some example implementations, layer 225 is a thin oxidation layer applied on rigid element 220 by using an anodizing process. The anodizing process for coating may be advantageous since it is low cost and can be applied to provide a thin layer ranging from few nanometers to few microns, e.g. 10 nm to 10 μm with relatively low tolerances. In some implementations, layer 225 has a defined texture or roughness that may be applied to reduce adhesion with elastomer 210 during contact. Optionally, layer 225 may also be color coded so that its thickness may be readily detected based on color.

Figure 3:
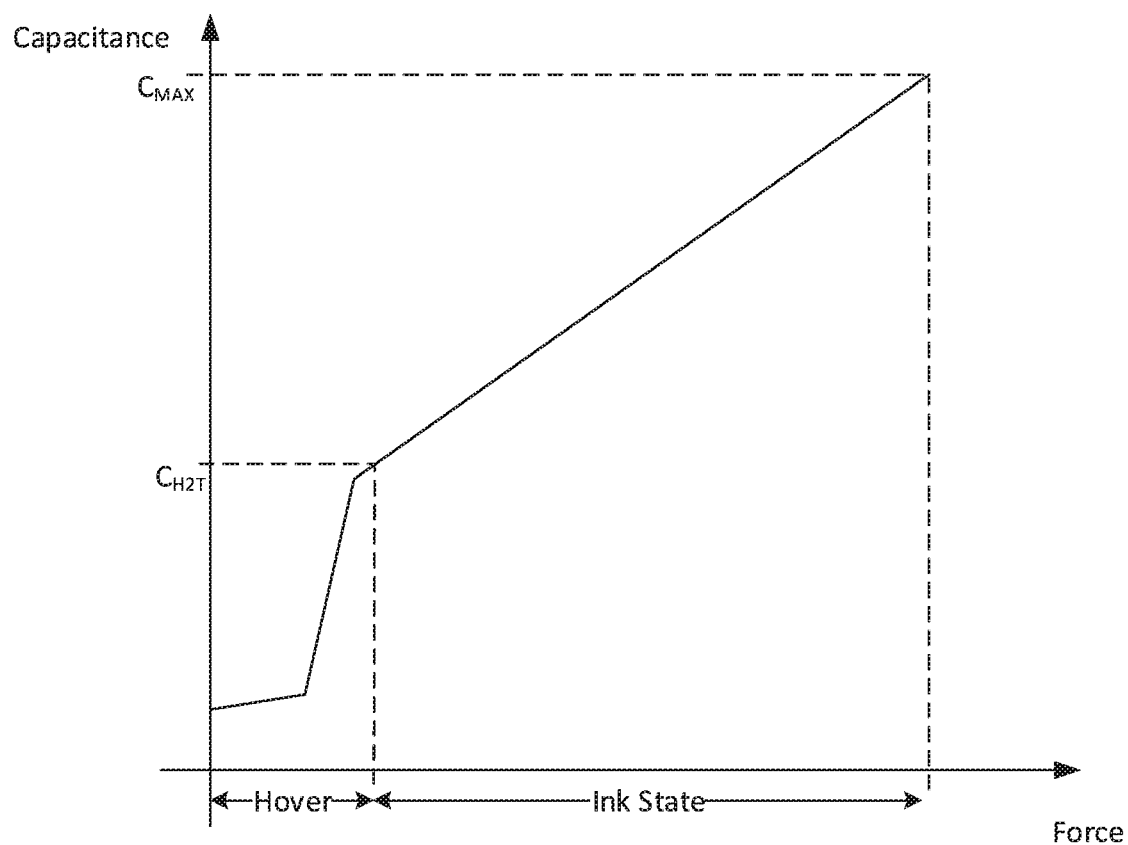
FIG. 3 is a simplified graph of capacitances that may be detected with an example pressure sensor integrated in the stylus.

Reference is now made to FIG. 3 showing a simplified graph of capacitances that may be detected with an example pressure sensor integrated in the stylus. In some implementations, output from pressure sensor 200 is applied to differentiate between a hover state and an ink state of stylus 100. Optionally, a cutoff between hover and ink occurs at a predefined level of capacitance $C_{H2T}$ between rigid element 220 and elastomer 210. In one example implementation, $C_{H2T}$ corresponds to capacitance detected when rigid element engages elastomer 210 with little to no force.

During an ink state (or touch state) of stylus 100, rigid element 220 may be engaged with elastomer 210 and the capacitive coupling may be governed by a change in surface contact area between rigid element 220 and elastomer 210 due to progressive deformation of elastomer 210 with increase in force. The slope of this curve may typically be governed by hardness of elastomer 210 and shape of rigid element 220.

Reference is now made to FIG. 4 showing a simplified schematic drawing showing an alternate configuration for an example pressure sensor integrated with a stylus. In some implementations, rigid element 220 is integrated as part of writing tip 153. Rigid element 220 is formed at an end of writing tip 153 that is distal to end 151. Writing tip 153 (including rigid element 220) may be machined from metal or molded with conductive plastic. Writing tip 153 may additionally include a flange 156 for supporting elastic element 160.

Reference is now made to FIG. 5 showing a simplified schematic drawing showing yet another configuration for an example pressure sensor integrated with a stylus. Pressure sensor 200 is assembled such that rigid element 220 engages elastomer 210 during a neutral state of writing tip 150, e.g., when no force is applied at end 151 of writing tip 150. In this example configuration air gap 157 (as shown in FIG. 2B) is eliminated. Optionally, in a configuration with no air gap 157, elastic properties of elastomer 210 may be used in place of elastic element 160 (for example, by eliminating elastic element 160).

Figure 6:
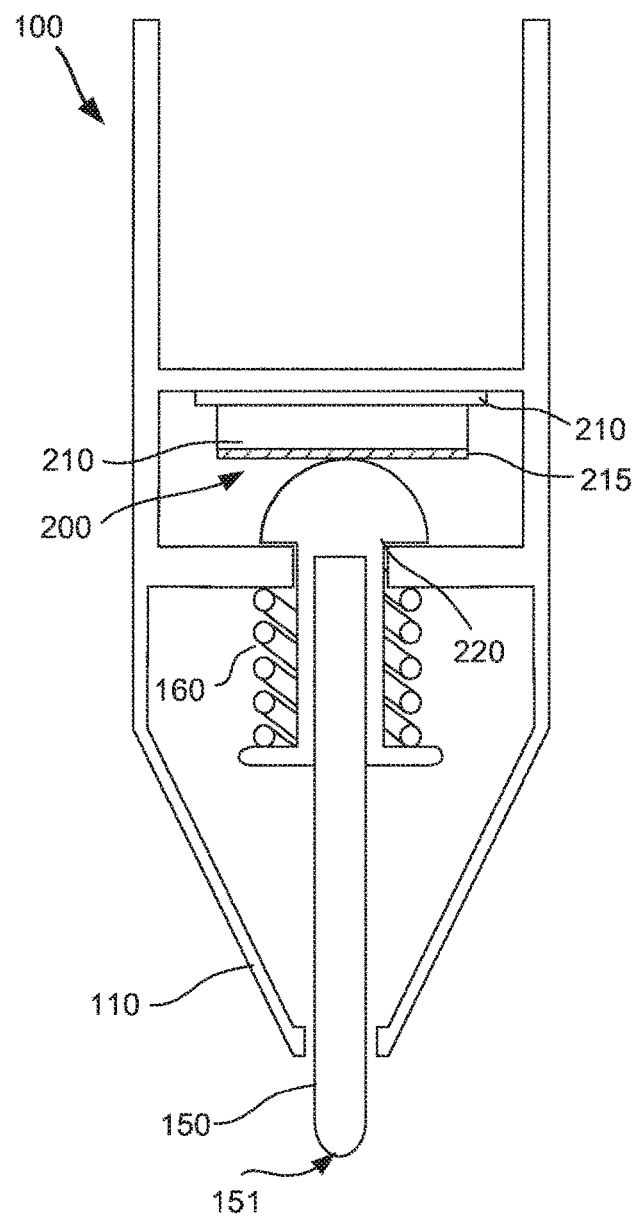
FIG. 6 is a simplified schematic drawing showing an alternate dielectric layer for an example pressure sensor integrated with a stylus.

Reference is now made to FIG. 6 showing a simplified schematic drawing of an alternate dielectric layer for an example pressure sensor integrated with a stylus. The dielectric layer 215 between rigid element 220 and elastomer 210 is integrated on elastomer 210 instead of rigid element 220. For example, elastomer 210 may be coated with a layer of silicone or other none conductive material such as a plasma. Layer 215 may be a thin layer of thickness that ranges between an order of magnitude of 10 nm and an order of magnitude of 10 μm, e.g. less than 20 μm. Optionally, layer 215 may be color coded to differentiate between different thickness. Optionally, layer 215 may be applied with a texture to reduce adhesion with rigid element 220 during contact.

Figure 7:
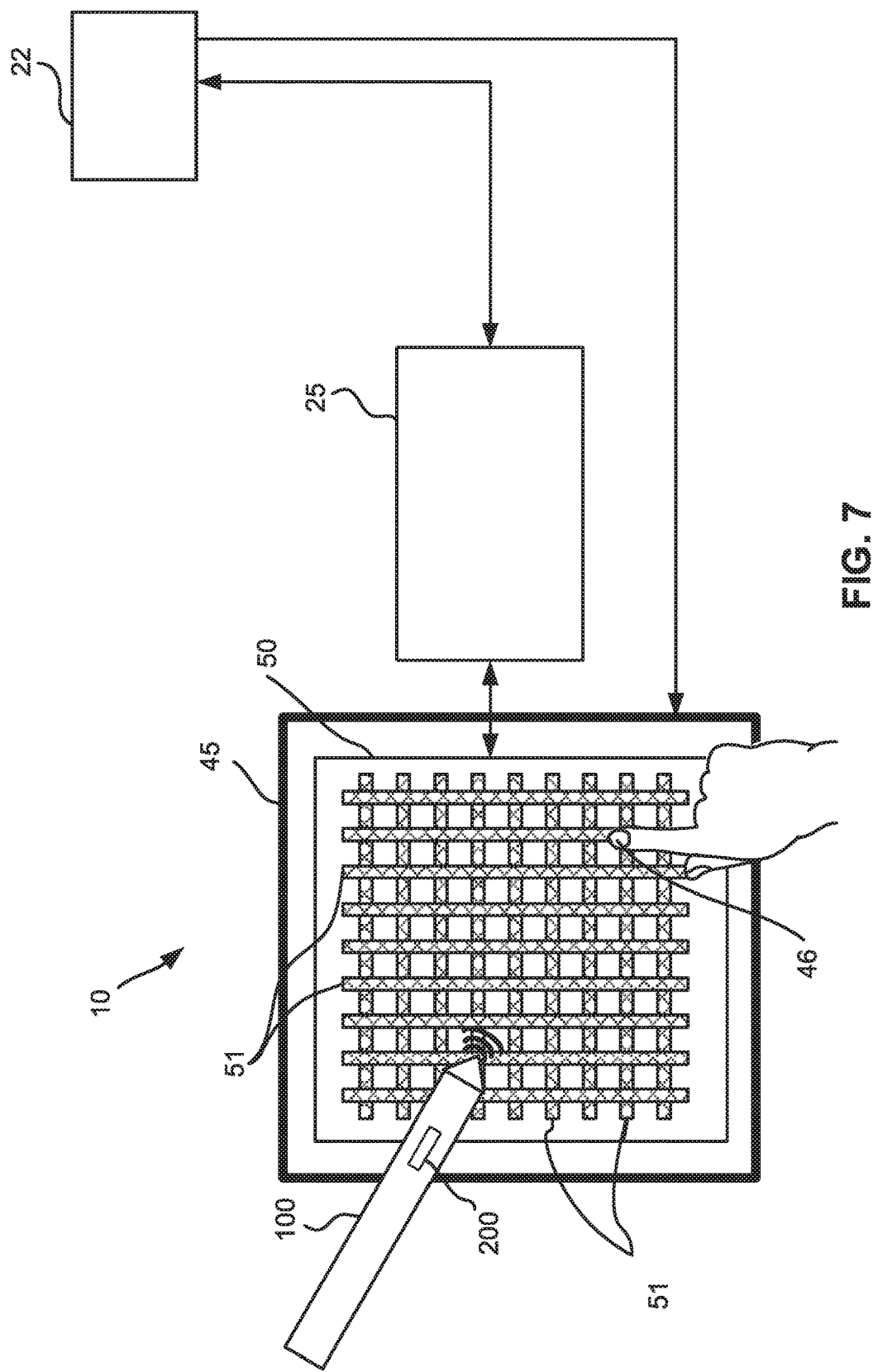
FIG. 7 is a simplified block diagram of an example computing device operated with the pressure sensitive stylus.

Reference is now made to FIG. 7 showing a simplified block diagram of an example computing device operated with the pressure sensitive stylus. According to some implementations, a computing device 10 includes a display screen 45 that is integrated with a digitizer sensor 50. Digitizer sensor 50 may be a grid based capacitive sensor formed from conductive strips 51 that are operative to detect both input by pressure sensitive stylus 100 transmitting a signal and input by one or more fingertips 46 or other conductive objects. Digitizer sensor 50 may be operated by digitizer circuitry 25 and may be in communication with host 22.

Pressure applied on a tip of stylus 100 may be sensed with pressure sensor 200 included in stylus 100. In some example implementations, output sensor 200 is transmitted by stylus 100 and picked up by one or more conductive lines 51. Optionally, output from sensor 200 is encoded in a position signal transmitted by stylus 100. Optionally, information indicating an ink or hover operational state, as detected by sensor 200, is encoded in the position signal transmitted by stylus 100. Optionally, output from sensor 200 is transmitted in response to a query signal transmitted by digitizer circuitry 25.

Output from digitizer circuitry 25 is reported to host 22. The output provided by digitizer circuitry 25 includes coordinates of stylus 200, a pressure state or level of a tip of stylus 200 and/or coordinates of one or more fingertips 46 interacting with digitizer sensor 50. Optionally, digitizer circuitry 25 reports a hover or ink state for stylus 200. Optionally, digitizer circuitry 25 reports pressure applied on the stylus tip. Optionally, some and/or all of the functionality of digitizer circuitry 25 are integrated and/or included in host 22.

According to some implementations an apparatus includes a housing; a tip configured to move with respect to the housing based on contact force applied to the tip; and a pressure sensor configured to detect force applied on the tip based on movement of the tip, wherein the sensor includes: a first element integrated or fixed to the tip, wherein the first element is formed from a rigid material that is conductive; a second element that is stationary with respect to the housing and positioned to face the first element, wherein the second element is conductive and has elastic properties, wherein one of the first element or the second element is coated with a non-conductive layer, and wherein the first element is configured to move toward the second element based on force applied on the tip and to deform the second element based on the force; and a circuit configured to detect capacitance between the first element and the second element.

Optionally, the first element is dome shaped or coned shaped.

Optionally, the second element is an elastomer.

Optionally, the second element has a flat shape.

Optionally, the non-conductive layer is between 10 nm and 20 μm thick.

Optionally, the non-conductive layer includes a texture configured to reduce adhesion between the first element and the second element.

Optionally, the first element is formed from metal and the non-conductive layer is anodized layer formed on the metal.

Optionally, the non-conductive layer is a silicon layer applied on the second element.

Optionally, the apparatus includes an elastic element mechanically coupled to the housing and the tip, wherein the elastic element is configured to provide a pre-load force on the tip.

According to some implementations a stylus includes a housing; a writing tip configured to move with respect to the housing based on contact force applied the writing tip; and a pressure sensor configured to detect force applied on the writing tip based on movement of the writing tip, wherein the sensor includes: a first element configured to move together with the writing tip, wherein the first element is formed from a rigid material that is conductive; a second element that is stationary with respect to the housing and positioned to face the first element, wherein the second element is a conductive elastomer, wherein one of the first element is coated with a non-conductive layer, and wherein the first element is configured to move toward the second element based on force applied on the tip and to deform the second element based on the force; and a circuit configured to detect capacitance between the first element and the second element.

Optionally, the first element is dome shaped or coned shaped.

Optionally, the writing tip is an elongated element including a first end configured to extend out of the housing and a second end maintained in the housing, wherein the second end includes the first element.

Optionally, the writing tip is machined from metal.

Optionally, the writing tip is molded with conductive plastic.

Optionally, the stylus includes a tip holder, wherein the writing tip is an elongated element including a first end configured to extend out of the housing and a second end maintained in the housing and wherein the tip holder is connected to the second end of the writing tip and includes the first element.

Optionally, the second element has a flat shape.

Optionally, the non-conductive layer is between 10 nm and 20 µm thick.

Optionally, the non-conductive layer is patterned with a defined texture.

Optionally, the first element is formed from metal and the non-conductive layer is a colored layer coated on the metal.

Optionally, the stylus includes spring mechanically coupled to the housing and the writing tip, wherein the spring is configured to provide a pre-load force on the writing tip.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. An apparatus comprising:
   a housing;
   a tip configured to move with respect to the housing based on contact force applied to the tip; and
   a pressure sensor configured to detect force applied on the tip based on movement of the tip, wherein the sensor includes:
      a first element integrated or fixed to the tip, wherein the first element is formed from a rigid material that is conductive;
      a second element that is stationary with respect to the housing and positioned to face the first element, wherein the second element is conductive and has elastic properties,
      wherein one of the first element or the second element is coated with a non-conductive layer between 10 nm and 20 µm thick, and wherein the first element is configured to move toward the second element based on force applied on the tip to deform the second element based on the force; and
      a circuit configured to detect capacitance between the first element and the second element.

2. The apparatus according to claim 1, wherein the first element is dome shaped or cone shaped.

3. The apparatus according to claim 1, wherein the second element is an elastomer.

4. The apparatus according to claim 1, wherein the second element has a flat shape.

5. The apparatus according to claim 1, wherein the non-conductive layer includes a texture configured to reduce adhesion between the first element and the second element.

6. The apparatus according to claim 1, wherein the first element is formed from metal and the non-conductive layer is anodized layer formed on the metal.

7. The apparatus according to claim 1, wherein the non-conductive layer is a silicon layer applied on the second element.

8. The apparatus according to claim 1, further comprising an elastic element mechanically coupled to the housing and the tip, wherein the elastic element is configured to provide a pre-load force on the tip.

9. A stylus comprising:
   a housing;
   a writing tip configured to move with respect to the housing based on contact force applied the writing tip; and
   a pressure sensor configured to detect force applied on the writing tip based on movement of the writing tip, wherein the sensor includes:
      a first element configured to move together with the writing tip, wherein the first element is formed from a rigid material that is conductive;
      a second element that is stationary with respect to the housing and positioned to face the first element, wherein the second element is a conductive elastomer,
      wherein one of the first element or the second element is coated with a non-conductive layer between 10 nm and 20 µm thick, and wherein the first element is configured to move toward the second element based on force applied on the tip deform the second element based on the force; and
      a circuit configured to detect capacitance between the first element and the second element.

10. The stylus according to claim 9, wherein the first element is dome shaped or cone shaped.

11. The stylus according to claim 9, wherein the writing tip is an elongated element including a first end configured to extend out of the housing and a second end maintained in the housing, wherein the second end includes the first element.

12. The stylus according to claim 11, wherein the writing tip is machined from metal.

13. The stylus according to claim 11, wherein the writing tip is molded with conductive plastic.

14. The stylus according to claim 9, further comprising a tip holder, wherein the writing tip is an elongated element including a first end configured to extend out of the housing and a second end maintained in the housing and wherein the tip holder is connected to the second end of the writing tip and includes the first element.

15. The stylus according to claim 9, wherein the second element has a flat shape.

16. The stylus according to claim 9, wherein the non-conductive layer is patterned with a defined texture.

17. The stylus according to claim 9, further comprising spring mechanically coupled to the housing and the writing tip, wherein the spring is configured to provide a pre-load force on the writing tip.

18. A system, comprising:
a computing device comprising a touch screen; and
a stylus comprising:
  a housing;
  a writing tip configured to move with respect to the housing based on contact force applied the writing tip; and
  a pressure sensor configured to detect force applied on the writing tip based on movement of the writing tip, wherein the sensor includes:
    a first element configured to move together with the writing tip, wherein the first element is formed from a rigid material that is conductive;
    a second element that is stationary with respect to the housing and positioned to face the first element, wherein the second element is a conductive elastomer,
    wherein one of the first element or the second element is coated with a non-conductive layer between 10 nm and 20 µm thick, and wherein the first element is configured to move toward the second element based on force applied on the tip to deform the second element based on the force; and
    a circuit configured to detect capacitance between the first element and the second element.

19. The system according to claim 18, wherein the non-conductive layer is a silicon layer applied on the second element.

20. The system according to claim 18, wherein the first element is dome shaped or cone shaped.

* * * * *